United States Patent [19]

Kokubo

[11] Patent Number: 6,038,032
[45] Date of Patent: Mar. 14, 2000

[54] HANDY PRINTING DEVICE THAT EXTRACTS SINGLE LINES FROM PRINT DATA CONTAINING PLURAL LINES

[75] Inventor: Masatoshi Kokubo, Aichi-ken, Japan

[73] Assignee: Brother Kogyo Kabushiki Kaisha, Nagoya, Japan

[21] Appl. No.: 08/998,804

[22] Filed: Dec. 29, 1997

[30] Foreign Application Priority Data

Dec. 28, 1996 [JP] Japan ..................................... 8-358503

[51] Int. Cl.[7] ........................... B41B 15/00; H04N 1/387; H04N 1/393; G06K 9/00
[52] U.S. Cl. .......................... 358/1.12; 358/1.12; 358/1.9; 358/450; 358/451; 358/452; 358/453; 382/116
[58] Field of Search .............................. 395/111; 358/451, 358/452, 523, 1.12, 1.9, 450, 453; 382/116

[56] References Cited

U.S. PATENT DOCUMENTS 4,920,502  4/1990  Yamada ................................... 364/514

FOREIGN PATENT DOCUMENTS 48-17630    3/1973   Japan .
1 366 253   9/1974   United Kingdom .

*Primary Examiner*—Edward L. Coles
*Assistant Examiner*—Twyler Lamb
*Attorney, Agent, or Firm*—McGinn & Gibb, P.C.

[57] ABSTRACT

A handy printing device comprises a printing unit that forms images on a print medium in consecutive scan lines resulting from scanning relative movement between the printing unit and the print medium: a movement amount detection unit that detects amount of relative movement between the printing unit and the print medium; an interface that receives print data from an external source; a received data memory that stores the print data received by the interface; a print data extraction unit that extracts, from the print data stored in the received data memory, print data to be printed by the printing unit in a single scan line; and a print control unit that controls the printing unit to print the single scan line based on detection by the movement amount detection unit and on the print data extracted by the print data extraction unit.

24 Claims, 8 Drawing Sheets

HANDY PRINTING DEVICE THAT EXTRACTS SINGLE LINES FROM PRINT DATA CONTAINING PLURAL LINES

BACKGROUND OF THE INVENTION

1. Field of the Invention

The present invention relates to a handy printing device capable of automatically forming images on a print medium when manually or automatically scanned across the surface of the print medium.

2. Description of the Related Art

A variety of printers, such as, dot impact, ink jet type printers, are known in the art. These printers normally stationary, that is, they are meant to be used in single location. Such printers include: a reciprocally moving carriage mounted with a thermal head or an ink jet head; and a sheet-feed mechanism, such as a platen, for moving a print sheet in a sheet-feed direction that is perpendicular to the reciprocal scan direction of the carriage. Printing is performed by reciprocally scanning the carriage across the surface of the print sheet while synchronously driving the sheet-feed mechanism. However, such stationary printers can only be used to print on cut-sheets or special continuous sheets and can not be used to print on oddly shaped sheets or notebooks, for example.

British Patent No. 1366253 discloses a handy printing device without a carriage or a sheet-feed mechanism. The disclosed printing device is manually scanned across a print medium. A movement amount detection unit detects relative positional change between the print head of the print device and a print medium and outputs a detection signal accordingly. To perform printing, a control portion drives the print head in synchronization with the detection signal from the movement amount detection unit. The handy printing device of British Patent No. 1366253 enables printing at any position on a variety of different types of printing medium, such as thick bound books or notebooks, print sheets with unusually large dimensions, or other printing medium that can not be used in stationary printers.

SUMMARY OF THE INVENTION

It in conceivable for a handy printing device to receive print data supplied from an external source and print images accordingly. In such a conceivable situation, the external device can either transmit print codes to the handy printing device, whereupon the handy printing device would generate image data using a computer graphics function, or the external device can generate print image data and transmit the print image data to the handy printing device, which would receive the print images and print accordingly. The latter method dispenses with the need for providing a computer graphics function to the handy printing device. Further, the handy printing device is able to print all character types that the external device can generate, and is not limited to the characters produced by the graphics function of the handy printing device.

Because such a conceivable handy printing device has no carriage or sheet-feed mechanism, the user is responsible for positioning the print head on the print medium as she or he scans the printing device across the surface of the print medium. However, when printing a plurality of consecutive lines by scanning the printing device across the print medium, it is difficult for the user to accurately align adjacent lines of print. Therefore, in the resultant text, adjacent lines can be split in half or shifted out of alignment so that the text is messy and hard to read.

An example of this conceivable problem will be given while referring to FIG. 1. In the example shown in FIG. 1, is the length of the nozzle row in the print head exceeds the width of one character train of source text, but it shorter than the width of two character lines of source. As a result, one portion of the B character train of source text will be printed with the A character train in one scan and the remaining portion of the B character train will be printed with the C character train in a separate scan. Because it is difficult to align subsequent adjacent scan lines, the user may inadvertently split the B character train because he or she was unable to correctly align the second scan with images printed during the first scan. When a single scan of the handy device prints a portion of a subsequent character line in addition to one or more full character lines in this manner, a character line with deviation, such as splitting or shifting of the character line, will be printed during each print scan. It is conceivable to configure the external device to detect line return information in the source text and then transmit only single lines of print data. However, such a configuration would increase the cost of the external device.

It is an objective of the present invention to provide a handy printing device capable of printing high quality images without print shift by extracting single lines of data, which are to be printed in a single print scan, from a plurality of lines of print data. Further, it is an objective of the present invention to provide such a handy printing device without requiring an external device to detect line return information in source text so that processing burden of the external device is not increased.

A handy printing device according to the present invention includes a printing unit that forms images on a print medium in consecutive scan lines resulting from scanning relative movement between the printing unit and the print medium; a movement amount detection unit that detects amount of relative movement between the printing unit and the print medium; an interface that receives print data from an external source; a received data memory that stores the print data received by the interface; a print data extraction unit that extracts, from the print data stored in the received data memory, print data to be printed by the printing unit in a single scan line; and a print control unit that controls the printing unit to print the single scan line based on detection by the movement amount detection unit and on the print data extracted by the print data extraction unit.

According to this aspect of the present invention, the printing device receives print data from the external source via the interface. The printing device then stores the print data in the first memory unit. The print data extraction unit extracts, from the print data stored in the first memory unit, print data to be printed in a single scan of the printing device with respect to the printing medium. A print control unit controls the printing unit to print out the extracted print data according to scanning movement between the print unit and record medium.

When the print data extracted by the print data extraction unit is print data for a single line of characters, even if the print data transmitted from the external source includes more lines of print data that can be printed in a single scan, each line of characters can be printed separately so that split or poorly aligned character lines can be prevented. Because the print data extraction unit extracts print data to be printed in a single print scan from the print data stored in the first memory unit, shifts in printed images can be prevented and good quality printing can be achieved.

An extracted data memory can be provided for storing print data extracted by the print data extraction unit. In this case, the print control unit controls to print out the print data stored into the extracted data memory. Alternatively, a mask register can be provided for using mask data to mask out all print data other than that extracted by the print data extraction unit, whereupon, the resultant print data in printed by the print unit scanning with respect to the print medium. With this configuration, there is no need to provide an additional extracted data memory for storing the extracted print data. Therefore, the memory capacity of the handy printing device can be reduced.

According to another aspect of the present invention, a print data combining unit is provided for combining non-extracted print data, which was not extracted by the print data extraction unit from print data stored in the received data memory, with print data subsequently received via the interface. With this configuration, there is no need for the external device to keep track of where character trains are separated by line returns when transmitting the print data to the print device. As a result, the burden on the external devices can be reduced.

According to another aspect of the present invention, the print data is stored in the received data memory in lines extending perpendicular to a row of nozzles of the printing unit. The print data extraction unit searches each line of print data for black dot data, when the number of consecutive lines with black dot data detected in the search exceeds the number of nozzles in the direction perpendicular to the print scanning direction of the print unit or when no black dot data Is detected in a line of print data after at least one line with black dot data is detected, then it is determined that print data has been retrieved for a line to be printed in a single scan. The print data extraction unit then extracts the print data for the line as print data to be printed in a single scan. In this way, the print data for a single line of characters, for example, can be extracted from a plurality of character lines so that misaligned, split, or shifted printing can be easily prevented.

BRIEF DESCRIPTION OF INVENTION

The above and other objects, features and advantages of the invention will become more apparent from reading the following description of the preferred embodiment taken in connection with the accompanying drawings in which.

DETAILED DESCRIPTION OF THE PREFERRED EMBODIMENTS

Figure 1:
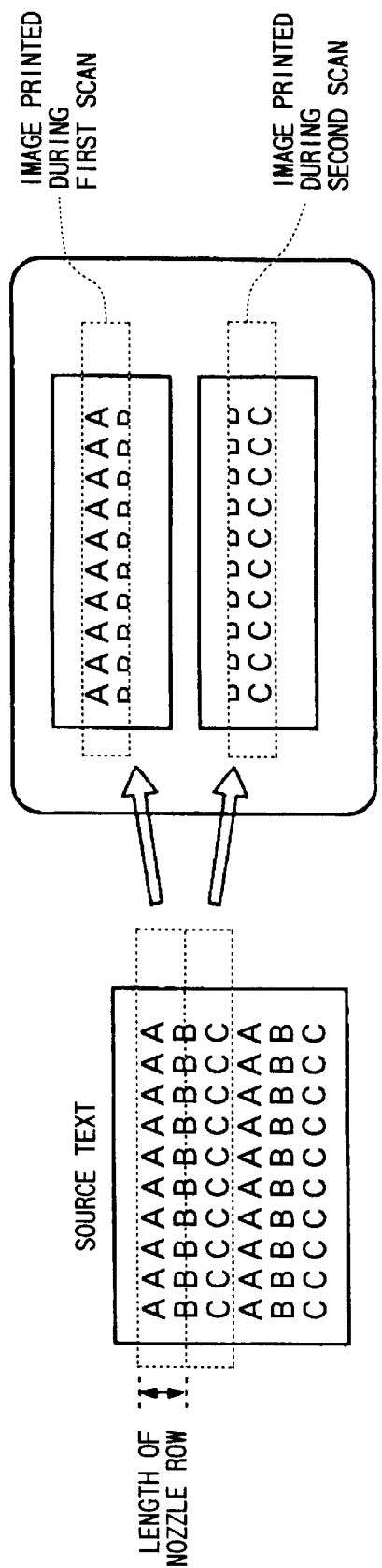
FIG. 1 is a schematic view showing how a conceivable handy printing device can produce print shift in consecutively printed lines.

A handy printing device according to a preferred embodiment of the present invention will be described while referring to the accompanying drawings wherein like parts and components are designated by the same reference numerals to avoid duplicating description.

Figure 2:
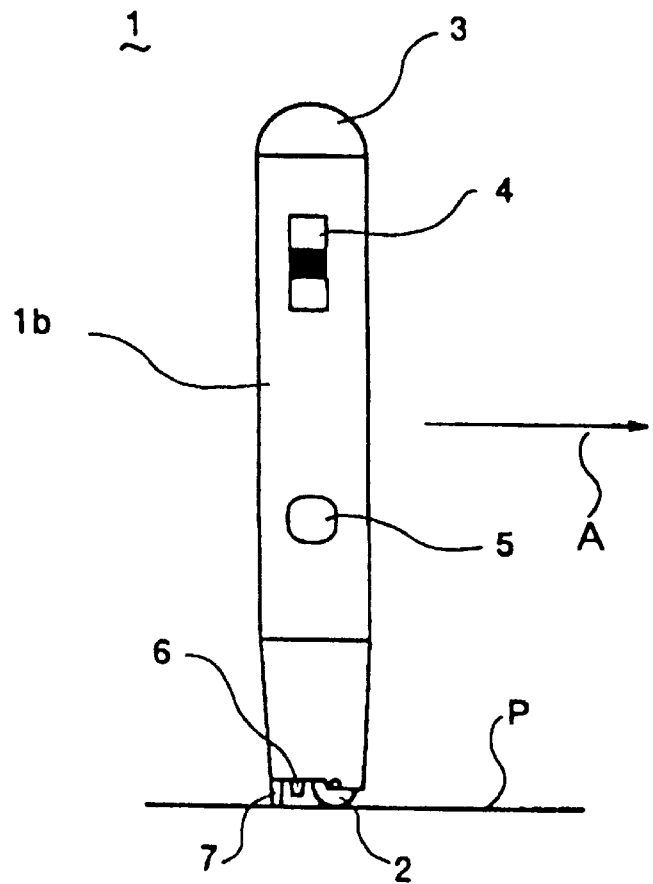
FIG. 2(a) is a perspective view showing a handy printing device according to an embodiment of the present invention.
FIG. 2(b) is a bottom view shoving a nozzle row of a print head of the handy printing device.
Figure 2:
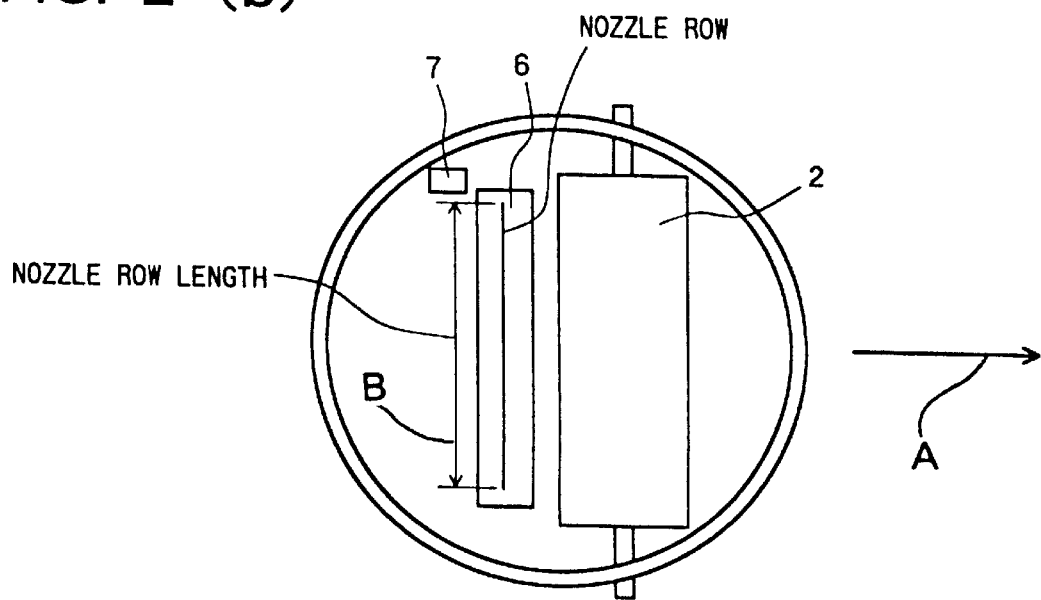

As shown in FIG. 2(a), the handy printing device 1 includes a body 1b that is cylindrically shaped to enable a user to easily hold it by hand. An infrared transmission interface 3 is disposed at the upper end of the body 1b. The interface 3 is for performing transmission and reception of a variety of data, such as print data, from an external device such as a personal computer 21 shown in FIG. 4. The body 1b is also provided with a power switch 4 for turning on and off a power source 14 shown in FIG. 3 and a print switch 5 for starting print operations of the handy printing device 1.

At the lower end of the body 1b is provided a roller 2, an Ink jet print head 6, and a micro switch 7. The roller 2 is rotatably supported on the body 1b on a rotational shaft and maintains the print head 6 at a fixed distance from the print medium p. The ink jet print head 6 is disposed between the roller 2 and the micro switch 7. As shown in FIG. 2(b), the print head 6 is formed with a row of nozzles through which ink droplets are ejected for printing images. The row of nozzles has a length equivalent to a certain number of nozzles, that is, 64 nozzles in the present embodiment, and extends in a direction perpendicular to a scan direction, indicated by arrows in FIGS. 2(a) and 2(b), in which the handy printing device 1 is scanned during printing. As shown on FIGS. 2(a) and 2(b), the arrow A is a scan direction (also called first direction) and the arrow B is the direction of the nozzle row (also called second direction). The micro switch 7 is for detecting whether or not a print medium P. such as paper, is positioned in confrontation with the print head 6.

Figure 3:
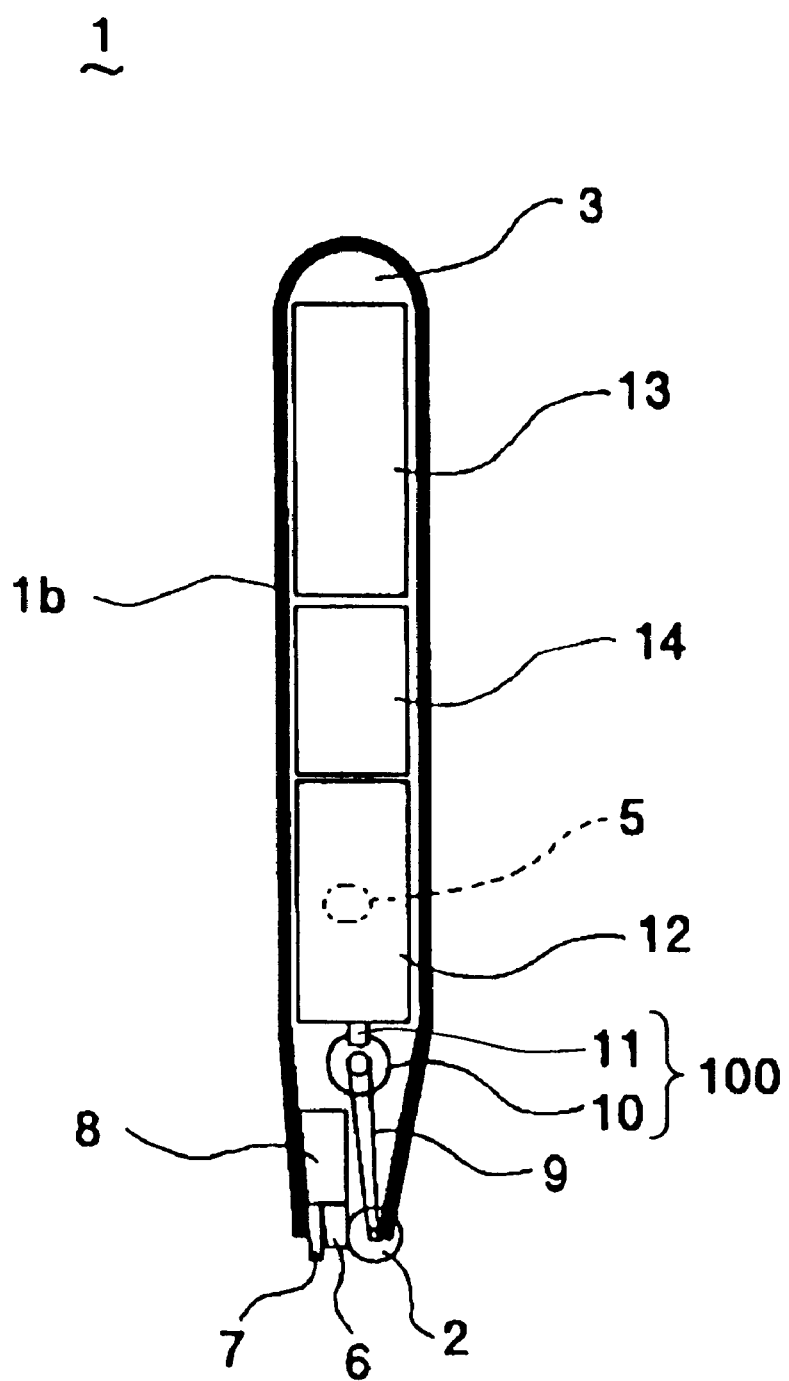
FIG. 3 is a cross-sectional view showing internal configuration of the handy printing device.

As shown in FIG. 3, the body 1b houses, in addition to the infrared transmission interface 3 and the power source 14; an ink tank 8 disposed above the print head 6 for supplying ink to the print head 6; an encoder 100 for detecting speed and direction of relative movement between the print head 6 and the print medium P; a main control board 13 for performing overall control of the handy printing device 1, and a print control board 12 for controlling an electric pulse signal from the encoder 100.

The power source 14 is for supplying power to the various components of the handy printing device 1 and 15 disposed near the center of the body 1b. The power source 14 is configured from a compact power supply unit, such as a battery, and a device for stabilizing supply of the power supply unit.

The encoder 100 includes a rotational disk 10 and a photo interrupter 11. The rotational disk 10 is connected so as to rotate in synchronization with the roller 2 by a belt 9 spanning between a pulley of the rotational disk 10 and another pulley which is disposed on the rotational shaft of the roller 2 so as to rotate in association with rotation of the roller 2. The rotational disk 10 is formed with slits at a predetermined interval around its periphery. The photo interrupter 11 detects the slits of the rotational disk 10 and outputs an on-off electric pulse signal accordingly. With this configuration, rotational force of the roller 2 is transmitted to the rotational disk 10 so that rotational speed of the roller 2, which corresponds to relative Avant between the print head 6 and the print medium P, is converted into the interval between pulses of the pulse signal. The pulse signal is then inputted into a head drive control portion 25 which controls the print head 6 accordingly. The photo interrupter 11 is also configured to detect rotational direction of the roller 2 and detect scan direction of the handy printing device 1 accordingly.

In order to print using the handy printing device 1, the user holds the body 1b so that the roller 2 contacts the upper surface of the print medium P. The user then scans the handy printing device 1 in a direction indicated by the arrow in FIGS. 2(a) and 2(b). As a result, the print head 6 is controlled to print the print data supplied from the external device onto the print medium P. The roller 2 supports the upright posture of the handy printing device 1 and maintains the print head 6 at a fixed distance from the print medium P. The relative position of the print head 6 to the print medium P is detected according to rotation of the roller 2 when the handy printing device 1 is scanned. Predetermined printing operations are performed accordingly.

Figure 4:
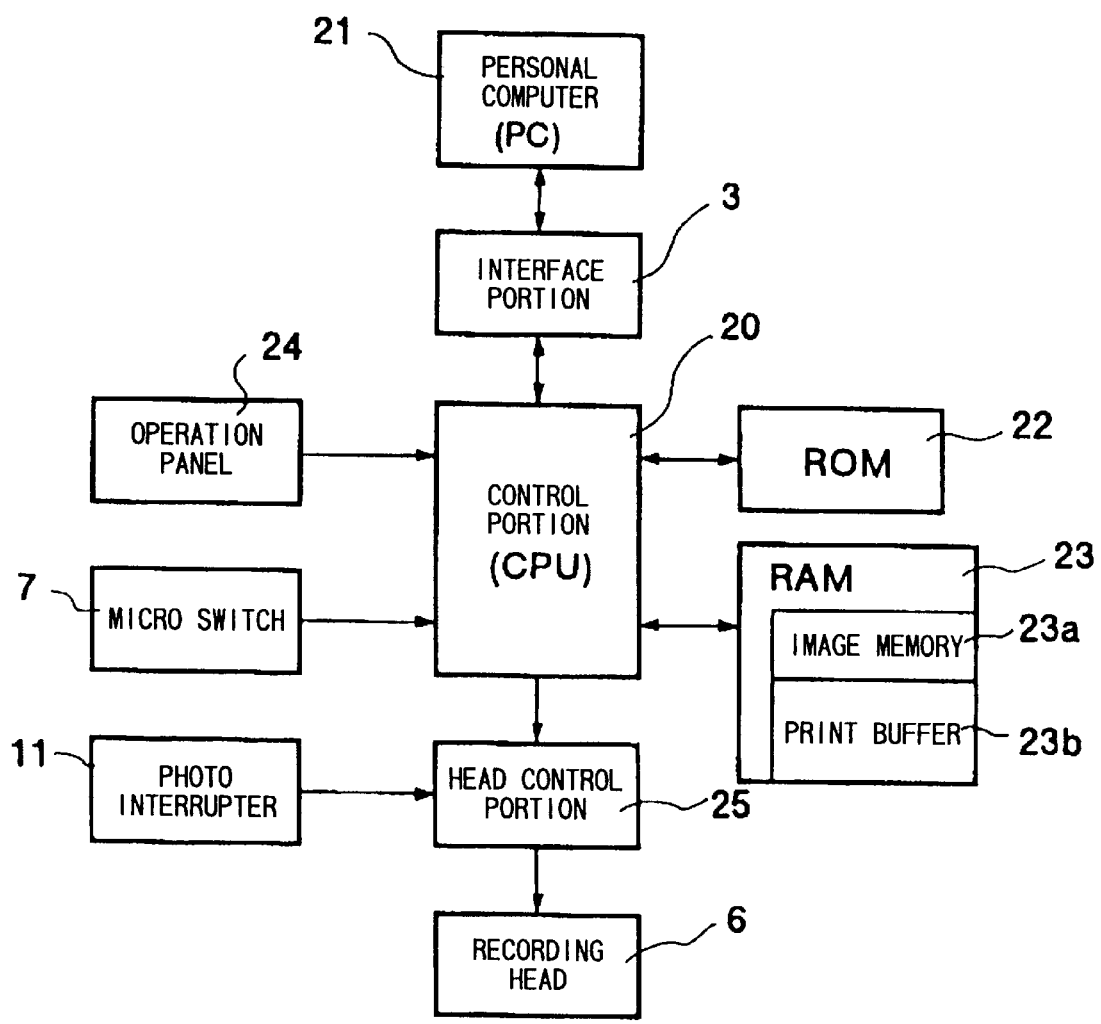
FIG. 4 is a block diagram showing components of a control system of the handy printing device.

Next, an explanation will be provided for the control system of the handy printing device 1 while referring to FIG. 4. The control system of the handy printing device 1 includes a control portion (CPU) 20 for controlling overall operations of the handy printing device 1. The CPU 20 is connected to a variety of components, such as the interface 3, the micro switch 7, the photo interrupter 11, and the head drive control portion 25, and also to an operation panel 24, a RON 22, and a RAM 23. It should be noted that the CPU 20, the ROM 22, and the RAM 23 are mounted on the main control board 13 and that the head drive control portion 25 is mounted on the print control board 12. The personal computer 21 is connected to the CPU 20 via the interface 3.

The ROM 22 stores control programs for controlling the various components of the handy printing device 1 by following a predetermined program. The RAM 23 includes an image memory 23a and a print buffer 23b. The image memory 23a is for storing print data including image data transmitted from the personal computer 21. In a manner to be described in more detail later, the CPU 20 extracts a single scan's worth of print data, which is to be printed in a single scan, from the bit image data stored in the image memory 23a. The print buffer 23b is for storing the single scan's worth of print data extracted by the CPU 20 from the bit image data stored in the image memory 23a. The CPU 20 further combines non-extracted print data, that is, any print data stored in the image memory 23a that was not extracted as a single scan's worth of print data, with new print data subsequently transmitted from the personal computer 21.

Figure 5:
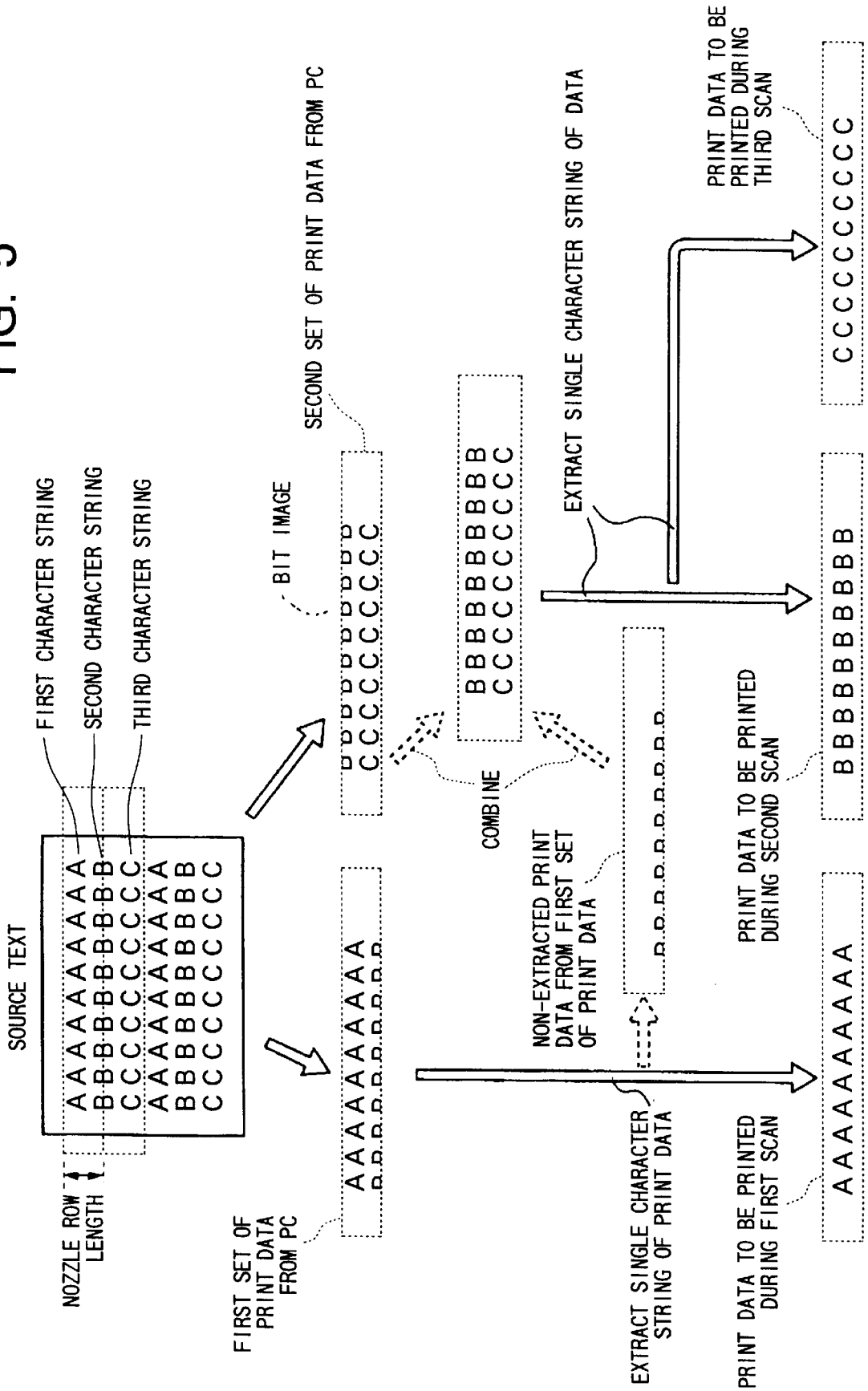
FIG. 5 is a schematic representation of processes for transmitting print data from a personal computer to the handy printing device, and for extracting and combining print data using a central processing unit of the handy printing device.

Next, an explanation will be provided for printing operations of the handy printing device 1 while referring to FIG. 5. FIG. 5 is a schematic representation of processes for transmitting print data from the personal computer 21 to the handy printing device 1, and for extracting and combining print data using the CPU 20. First, the personal computer 21 transmits a first set of bit image data to the handy printing device 1 as an infrared signal, which is received by the interface 3. The inputted first set of bit image data is stored in the image memory 23a. The CPU 20 extracts, from the bit image data stored in the image memory 23a, a single line of print data to be printed in a single scan, that is in a single sweep, of the body 1b and stores the extracted print data in the print buffer 23b. Details of this print data extraction process will be provided later. When the user operates the print switch 5 on the operation panel 24, a print start signal is transmitted to the CPU 20. When the CPU 20 receives the print start signal, it confirms whether or not print data is stored in the print buffer 23b. When print data is stored in the print buffer 23b, the CPU 20 puts the handy printing device 1 into a standby condition. Next, the user places the handy printing device 1 on the print medium P. As a result, the micro switch 7 is turned on so that the CPU 20 confirms that the print medium P is in a position in confrontation with the print head 6. The user then manually scans the handy printing device 1 across the surface of the print medium P so that the rotational disk 10 of the encoder 100 rotates. The photo interrupter 11 detects rotation of the rotational disk 10 and outputs a detection signal accordingly. The head drive control portion 25 controls output of print data in synchronization with the detection signal from the photo interrupter 11 and drives the print head 6 to print on the print medium P accordingly. Because the head drive control portion 25 controls output of print data in synchronization with the detection signal from the photo interrupter 11, even if the user does not scan the body 1b across the surface of the print medium P at a uniform speed, the handy printing device 1 will print uniformly across the print medium P. When a single scan of the body 1b is completed, the CPU 20 combines print data remaining in the image memory 23a, that is, print data that was not extracted as the first line of print data, with the next set of print data transmitted from the personal computer 21.

Figure 6:
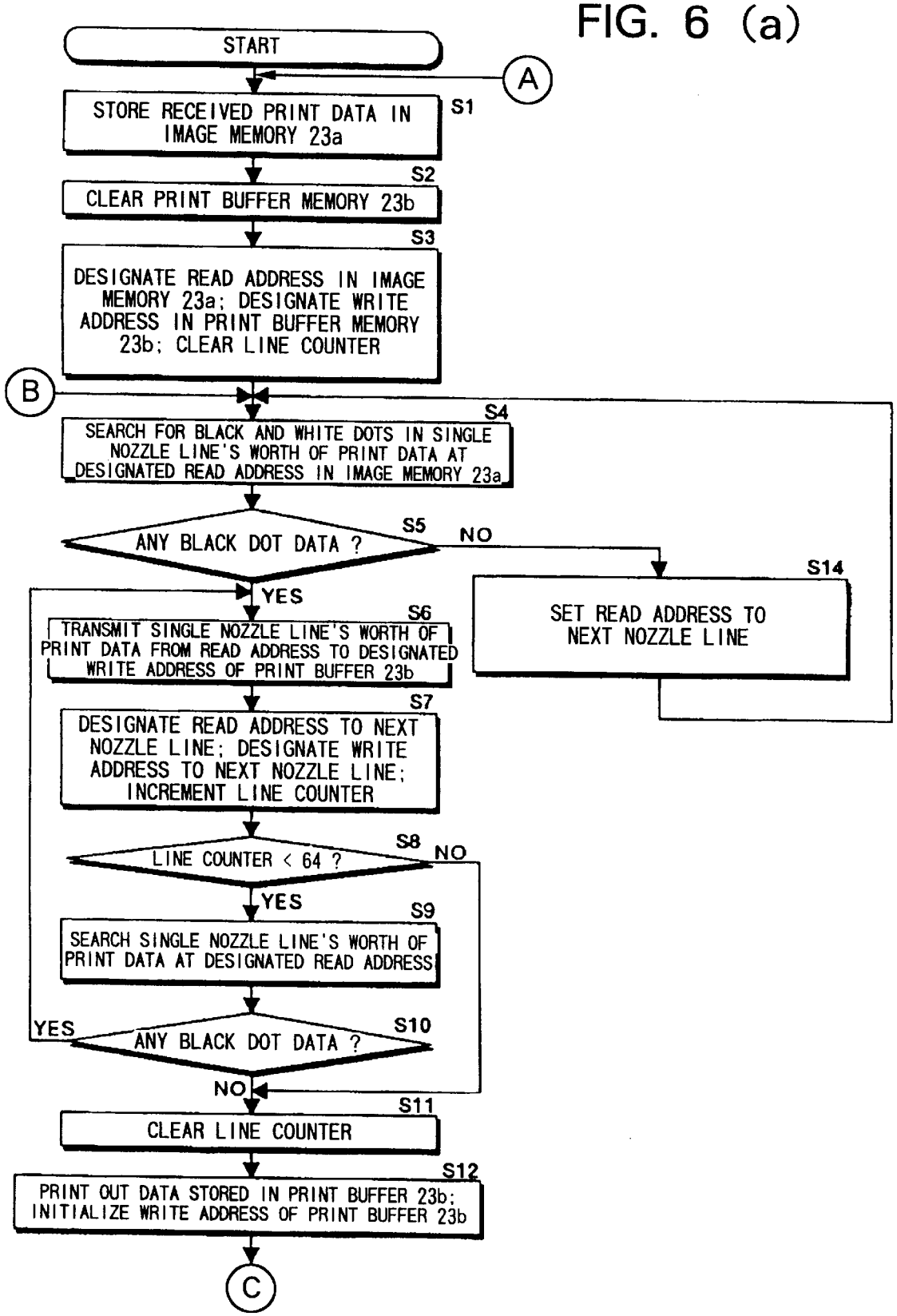
FIG. 6(a) is a flowchart representing processes for extracting print data during printing operations of the handy printing device.
FIG. 6(b) is a continuation of the flowchart shown in FIG. 6(a)
Figure 6:
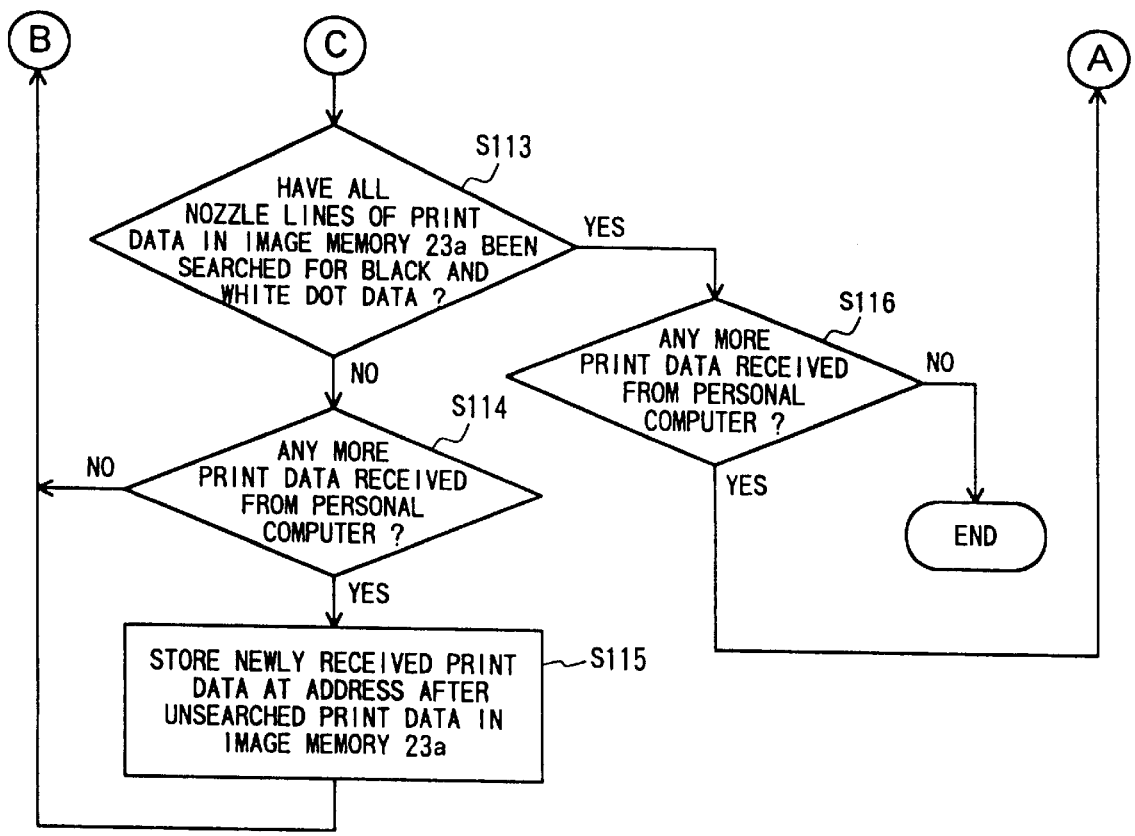

A process performed by the handy printing device 1 for extracting and combining print data will be explained while referring to FIGS. 5 and 6(a) and 6(b). FIGS. 6(a) and 6(b) show a flowchart representing processes for extracting print data during printing operations. When the power source of the handy printing device 1 in turned on, the CPU 20 receives one set of bit image data from the personal computer 21 via the interface 3. Each set of bit image data contains an amount of print data equivalent to the amount of print data that can be printed in a single scan and corresponds to the length of the row of nozzles in the print head 6, the length being 64 nozzles in the present embodiment as mentioned previously. During the processes represented in FIGS. 6(a) and 6(b), the bit image data is processed one nozzle line at a time. Each nozzle line of print data corresponds to print data printed by a certain nozzle of the print head 6 during a single scan. Therefore, each set of bit image data has 64 nozzle lines of bit data.

In S1, the CPU 20 stores the received print data into the image memory 23a of the RAM 23. In S2, the CPU 20 clears the print buffer 23b. In S3, the CPU 20 sets a read address of the image memory 23a, sets a write address for the print buffer 23b, and clears a line counter for counting in later steps a number of consecutive nozzle lines found to have black dot data. In S4, the CPU, 20 searches for white and black dots in a single nozzle line's worth of print data from the read address set for the image memory 23a.

Next, in S5, whether or not black dot data exists in the single nozzle line's worth of print data is judged. When no black data exists in the single line's worth of print data at the read address of the image memory 23a (S5:NO), then in S14 the read address is set to the next nozzle line. After S14, the program returns to S4, whereupon white and black data is searched for in the next nozzle line's worth of print data.

When black dot data exists in the single nozzle line's worth of print data at the designated read address of the image memory 23a (S5:YES), then in S6, the CPU 20 transmits the single nozzle line's worth of print data from the designated read address of the Image memory 23a to the print buffer 23b. Next in S7, the CPU 20 sets the read address for the image memory 23a and the write address for the print buffer 23b to the next nozzle line of print data and also increments the line counter by one.

Next, whether or not the line counter indicates a value less than 64 is determined in 68. If so (S8:YES), then in S9, the CPU 20 searches for white and black dots in the print data of nozzle line's worth of print data in the read address of the image memory 23a designated in S7. In S10, the CPU 20 determines whether or not any black dot data exists in the nozzle line's worth of print data designated in S7. If 80 (S10:YES), then the program returns to S6, whereupon the single nozzle line's worth of print data at the designated read address of the Image memory 23a is transmitted to the designated write address of the print buffer 23b.

When the number indicated by the line counter exceeds 64 (S8:NO), or when no black dot data is found in the line's worth of print data (S10:NO), then it is determined that print data for a character string or other image to be printed in a single scan is now completely stored in the print buffer 23b. Said differently, it is determined that print data for the present character string has been extracted as data to be printed in a single print scan. Next, in S11 the line counter is cleared and in S12 the extracted print data stored in the print buffer 23b is printed and the write address of the print buffer 23b is initialized.

Next, in S113 shown in FIG. 6(b), whether or not all the nozzle lines of print data in the image memory 23a have been searched for black and white dot data is determined. If not (S113:NO), then in S114, whether or not any more print data has been received from the personal computer 21 is determined. If more data has been received (S114:YES), then in S115, the newly received print data is stored in the image memory 23a at the address after the unsearched print data. As a result of S115, any remaining data, that is, unsearched data in image memory 23a is combined with newly received print data in the manner shown in FIG. 5. In this way, print data not extracted as a character string of data of the first line in the image memory 23a is combined with print data for the next character string received via the interface 3. Afterward, the program returns to S4. It should be noted that the program returns directly to S4 when S114 results in a negative Judgment.

When S113 results in a positive judgment, then in S116. whether or not any more print data has been received from the personal computer 21 is determined. If more print data has been received (S116:YES), then the program returns to S1 to process the newly received print data. If no more print data is received (S116:NO), then printing operations are completed so that the program is ended.

In this way, all the nozzle liners worth of bit image data in the image memory 23a are searched one at a time for black and white dot data. When no black dot data is found (S5:NO), then S4, S5, and S14 are repeatedly performed until a nozzle line of print data is found that contains black dot data (S5:YES). The processes of S4, S5, and S14 are performed so that only lines having some black dot data will be printed out. In other words, lines having only white dot data are removed from before or after a character line or from between consecutive character lines so that a maximum amount of image can be printed with each scan of the handy printer. When a nozzle line is found to contain black dot data (S5:YES), this is interpreted as the first nozzle line of a character line to be printed in a single scan. As a result, S6 to S10 are repeatedly performed until print data to be printed in a single scan is extracted and stored in the print buffer 23b, whereupon the print data in the print buffer 23b is printed out in S12. Whether or not the print buffer 23b contains print data to be printed in a single scan is determined based on whether or not the print buffer 23b stores print data for the maximum number of nozzle lines, i.e., 64, that can be printed in a single scan (S8:NO) or whether or not the end of the character line is detected (S10:NO). Once a single scan line of print data has been is printed out, then any non-extracted print data remaining in the image memory 23a is combined with any set of print data newly received from the personal computer 21 (S115).

Because each print scan is used to print each character strings as an integral line unit, text can be printed without split or misaligned character lines so that good quality printing is achieved. Further, because print data not extracted from the image memory 23a as print data for a single line of characters is combined with print data for the next character line received via the interface 3, there is no need for the external device to detect and manage line return information in the print data when transmitting image data to the handy printing device 1. This reduces the burden on the external device. As shown in the example of FIG. 5, even when two scan's worth of print data includes three lines of characters strings, the external device need not separate the three lines of character strings before transmitting the print data. Instead, the external device needs only performed two transmissions of print data, wherein each transmission includes a single scan's worth of print data. This also reduces the burden placed on the external device.

While the invention has been described in detail with reference to specific embodiments thereof, it would be apparent to those skilled in the art that various changes and modifications may be made therein without departing from the spirit of the invention, the scope of which is defined by the attached claims.

Figure 7:
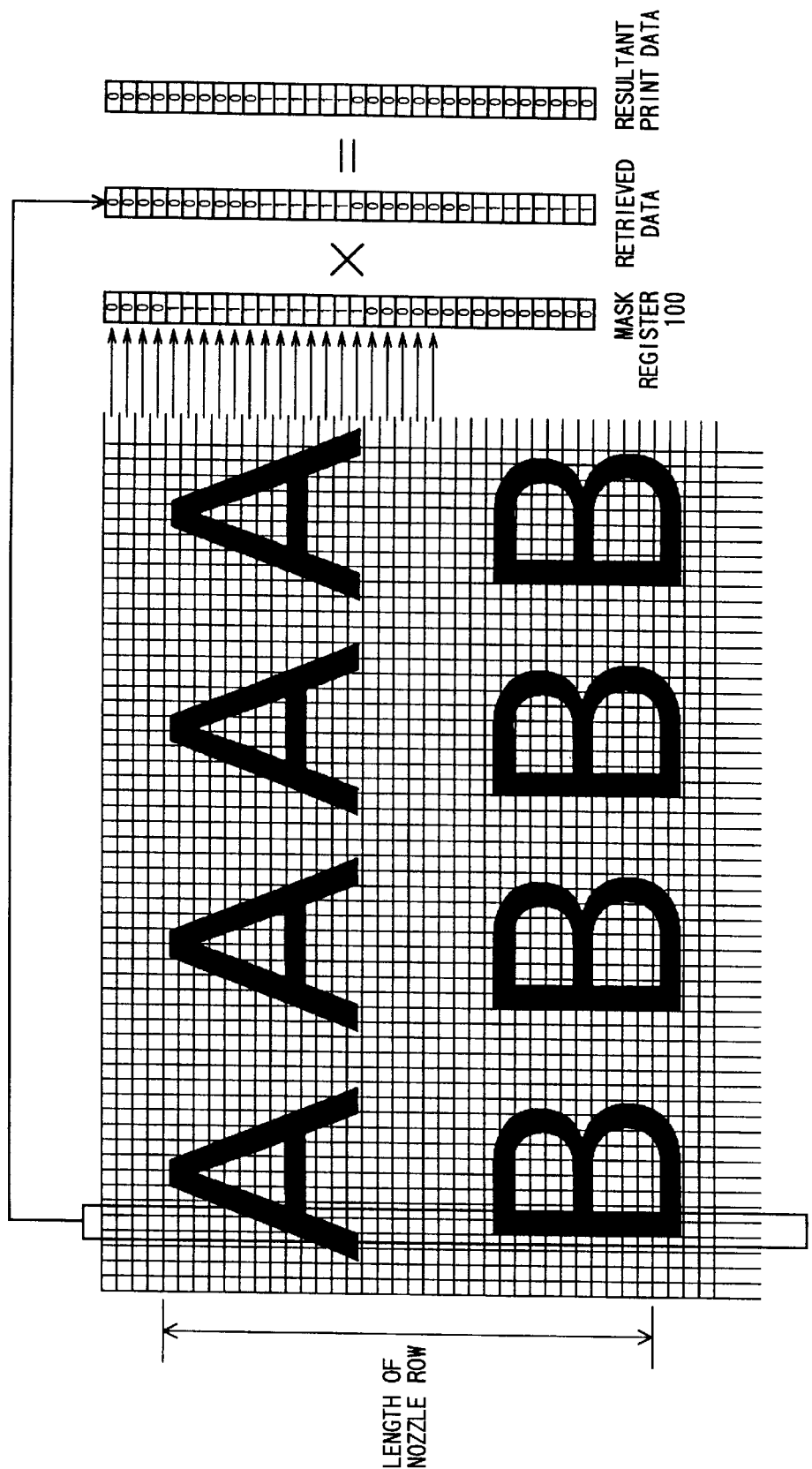
FIG. 7 is a schematic view showing a mask register according to a modification of the embodiment.

For example, the print buffer 23b of the RAM 23 can be dispensed with. In other words, although the handy printing device of the embodiment has a print buffer 23b in the RAM 23, wherein print data for a line of characters is extracted from the print data stored in the image memory 23a of the RAM 23 is stored in the print buffer 23b and then printed out, the present invention is not limited to this configuration. Instead, as shown in FIG. 7, the handy printing device 1 can be provided with a mask register 100. The example shown in FIG. 7 is for the case when the nozzle row is 32 nozzles in length. The mask register 100 stores mask data for masking out print data in the image memory 23a other than the print data extracted for printing a character string or other image in a single scan. The print data processed by the mask register 100 will include black dots only for an image to be printed out in a single scan. When the print buffer 23b is dispensed with In this manner, less memory capacity is required for the RAM 23 so that a less expensive RAN can be used.

Also, although the embodiment describes the present invention applied to print data for character lines, the present invention could be applied to print data for any type of image, including but not limited to symbols, graphics, pictures, and Japanese kanji.

What is claimed is:

1. A handy printing device comprising:
   a printing unit having a print head that prints an image on a print medium when relative movement is generated between the printing unit and the print medium in a first direction, the print head having a width that defines a maximum possible height in a second direction, which is perpendicular to the first direction, that an image can be printed in a single scan in the first direction;
   a movement amount detection unit that detects amount of relative movement between the printing unit and the print medium in the first direction;
   an interface that receives, from an external source, a set of print data containing print data for at least a single line of images and for at least a portion of another line of images, the at least single line of images extending in the second direction to less than the maximum possible height;

a received data memory that stores the set of print data received by the interface;

a print data extraction unit that extracts, from the set of print data stored in the received data memory, print data for the at least single line of images; and a print control unit that controls the printing unit to print the at least single line of images based on detection by the movement amount detection unit and on the print data extracted by the print data extraction unit.

2. A handy printing device as claimed in claim 1, further comprising an extracted data memory that stores the print data extracted by the print data extraction unit, the print control unit controlling the printing unit to print the at least single line of images based on the print data stored in the extracted data memory.

3. A handy printing device as claimed in claim 2, further comprising a print data combining unit that combines print data, which was not extracted by the print data extraction unit from the set of print data stored in the received data memory, with subsequent print data received by the interface.

4. A handy printing device as claimed in claim 2, wherein the set of print data stored in the received data memory includes dot lines representing lines of dots extending in the first direction in which relative movement is generated between the printing unit and the print medium in order to form each scan line, the print data extraction unit consecutively searching each dot line stored in the received data memory for black and white dot data in order to extract dot lines having black dot data as print data to print the at least single line of images.

5. A handy printing device as claimed in claim 4, wherein:

the printing unit includes nozzles for electing ink droplets to print images, the nozzles being aligned in a row extending in the second direction perpendicular to the first direction to a length equivalent to a certain number of nozzles; and the print data extraction unit, when a number of consecutive dot lines having black dot data exceeds the certain number of nozzles, extracts the consecutive dot lines as data to be printed in a single print scan.

6. A handy printing device as claimed in claim 5, wherein the print data extraction unit includes a line counter for counting a number of searched dot lines, the print data extraction unit clearing the line counter each time a dot line with only white dot data is detected so that the line counter indicates the number of consecutive dot lines having black dot data.

7. A handy printing device an claimed in claim 6, wherein the print data extraction unit, when a dot line having only white dot data is detected after at least one dot line having black dot data, extracts the at least one dot line having black dot data as data to be printed in a is single print scan.

8. A handy printing device as claimed in claim 4, wherein the print data extraction unit, when a dot line having only white dot data is detected after at least one dot line having black dot data, extracts the at least one dot line having black dot data as data to be printed In a single print scan.

9. A handy printing device as claimed in claim 1, further comprising a mask register storing mask data that masks out print data other than print data extracted by the print data extraction unit, the print control unit controlling the printing unit to print the at least single line of images based on print data processed by the mask register.

10. A handy printing device as claimed in claim 9, further comprising a print data combining unit that combines print data, which was not extracted by the print data extraction unit from the set of print data stored in the received data memory, with subsequent print data received by the interface.

11. A handy printing device as claimed in claim 9, wherein the print data stored in the received data memory includes dot lines representing lines of dots extending in the first direction in which relative movement is generated between the printing unit and the print medium in order to form each scan line, the print data extraction unit consecutively searching each dot line stored in the received data memory for black and white dot data in order to extract dot lines having black dot data as print data to print the at least single line of images.

12. A handy printing device as claimed in claim 11, wherein:

the printing unit includes nozzles for electing ink droplets to print images, the nozzles being aligned in a row extending in the second direction perpendicular to the first direction to a length equivalent to a certain number of nozzles; and the print data extraction unit, when a number of consecutive dot lines having black dot data exceeds the certain number of nozzles, extracts the consecutive dot lines as data to be printed in a single print scan.

13. A handy printing device as claimed in claim 11, wherein the print data extraction unit, when a dot line having only white dot data is detected after at least one dot line having black dot data, extracts the at least one dot line having black dot data as data to be printed in a single print scan.

14. A handy printing device as claimed in claim 1, wherein the at least single line of images together with the at least a portion of another line of images extend in the second direction to an extent equal to the maximum possible height.

15. A handy printing device comprising:

printing means for printing an image on a print medium when relative movement is generated between the printing means and the print medium in a first direction, the print head having a width that defines a maximum possible height in a second direction, which is perpendicular to the first direction, that an image can be printed in a single scan in the first direction, the printing means having a print head;

movement amount detection means for detecting amount of relative movement between the printing means and the print medium in the first direction;

interface means for receiving, from an external source, a set of print data containing print data for at least a single line of images and for at least a portion of another line of images, the at least single line of images extending in the second direction to less than the maximum possible height;

received data memory means for storing the set of print data received by the interface means;

print data extraction means for extracting, from the set of print data stored in the received data memory means, print data for the at least single line of images; and print control means for controlling the printing means to print the at least single line of images based on detection by the movement amount detection means and on the print data extracted by the print data extraction means.

16. A handy printing device as claimed in claim 15, further comprising extracted data memory means for storing the print data extracted by the print data extraction means, the print control means controlling the printing means to print the at least single line of images based on the print data stored in the extracted data memory means.

17. A handy printing device as claimed in claim 16, further comprising print data combining means for combining print data, which was not extracted by the print data extraction means from the set of print data stored in the received data memory, with subsequent print data received by the interface means.

18. A handy printing device as claimed in claim 16, wherein the set of print data stored in the received data memory means includes dot lines representing lines of dots extending in the first direction in which relative movement is generated between the printing means and the print medium in order to form each scan line, the print data extraction means consecutively searching each dot line stored in the received data memory means for black and white dot data in order to extract dot lines having black dot data as print data to print the at least single line of images.

19. A handy printing device as claimed in claim 15, further comprising mask register means for storing mask data that masks out print data other than print data extracted by the print data extraction means, the print control means controlling the printing means to print the at least single line of images based on print data processed by the mask register means.

20. A handy printing device as claimed in claim 19, further comprising print data combining means for combining print data, which was not extracted by the print data extraction means from the set of print data stored in the received data memory means, with subsequent print data received by the interface means.

21. A handy printing device as claimed in claim 19, wherein the print data stored in the received data memory means includes dot lines representing lines of dots extending in the first direction in which relative movement is generated between the printing means and the print medium in order to form each scan line, the print data extraction means consecutively searching each dot line stored in the received data memory means for black and white dot data in order to extract dot lines having black dot data as print date to print the at least single line of images.

22. A handy printing device comprising:

a printing unit that forms images on a print medium in consecutive scan lines resulting from scanning relative movement between the printing unit and the print medium;

a movement amount detection unit that detects amount of relative movement between the printing unit and the print medium;

an interface that receives print data from an external source, the print data including a plurality of sets of data, each set including a plurality of scan lines of data;

a received data memory that stores the print data received by the interface;

a print data extraction unit that separately examines each set of data and extracts, from each set of data, a first group of print data to be printed by the printing unit in a single scan line, the print data extraction unit further determining a second group of print data to be printed in a subsequent scan line; and a print control unit that controls the printing unit to print the single scan line based on detection by the movement amount detection unit and on the first group of print data extracted by the print data extraction unit.

23. A handy printing device comprising:

printing means for forming images on a print medium in consecutive scan lines resulting from scanning relative movement between the printing means and the print medium;

movement amount detection means for detecting amount of relative movement between the printing means and the print medium;

interface means for receiving print data from an external source, the print data including a plurality of sets of data, each set including a plurality of scan lines of data;

received data memory means for storing the print data received by the interface means;

print data extraction means for separately examining each set of data and for extracting, from each set of data, a first group of print data to be printed by the printing means in a single scan line, the print data extraction unit further determining a second group of print data to be printed in a subsequent scan line; and print control means for controlling the printing means to print the single scan line based on detection by the movement amount detection means and on the first group of print data extracted by the print data extraction means.

24. A handing printing device as claimed in claim 15, wherein the at least single line of images together with the at least a portion of another line of images extend in the second direction to an extent equal to the maximum possible height.

* * * * *